United States Patent [19]

Williams

[11] 4,324,132

[45] Apr. 13, 1982

[54] APPARATUS AND METHOD FOR MEASURING THE RATE OF EVAPORATION OF A LIQUID

[75] Inventor: Richard Williams, Princeton, N.J.
[73] Assignee: RCA Corporation, New York, N.Y.
[21] Appl. No.: 139,738
[22] Filed: Apr. 14, 1980
[51] Int. Cl.³ ............................................ G01N 33/00
[52] U.S. Cl. .................................................... 73/61.3
[58] Field of Search .................................... 73/61.3, 53

[56] References Cited

U.S. PATENT DOCUMENTS 1,014,139  1/1912  Freeman ............................. 73/61.3

FOREIGN PATENT DOCUMENTS 256310  10/1970  U.S.S.R. .............................. 73/61.3
381027   7/1973  U.S.S.R. .............................. 73/61.3

OTHER PUBLICATIONS

*Quarterly Weather Report* (British) *Meteorological* by W. N. Shaw, 1877, pp. 35-42 and chart, cited on page two of the specification of the patent application filed herewith.
*Industrial and Engineering Chemistry*, vol. 6, No. 2, Mar. 15, 1934, published by the American Chemical Society, by R. L. Peek Jr., et al, pp. 85-90, cited on page four of the specification of the patent application filed herewith.
*Journal of Hydrology* 39, (1978) pp. 159-173, by G. W. Bloemen, published by the Elsevier Scientific Publishing Company, Amsterdam, cited on page one of the specification of the patent application filed herewith.
*Meteorological Instruments* by W. E. Knowles Middletown, published by the University of Toronto Press, 1942, pp. 114-116, cited on page two of the specification of the patent application filed herewith.

*Primary Examiner*—Donald O. Woodiel
*Attorney, Agent, or Firm*—Birgit E. Morris; Donald S. Cohen; Joseph D. Lazar

[57] ABSTRACT

An evaporimeter is formed of a capillary tube hydraulically coupled to a sheet of filter paper to form a capillary system establishing hydraulic continuity of liquid between the tube and the surface of the filter paper. The rate of evaporation from the surface of the filter paper of a liquid such as water in the tube and filter paper is measured by the water front movement in the tube as the water is drawn from the tube to replace the evaporated water.

16 Claims, 7 Drawing Figures

APPARATUS AND METHOD FOR MEASURING THE RATE OF EVAPORATION OF A LIQUID

This invention relates to an apparatus for measuring the rate of evaporation of a liquid particularly water.

The rate of evaporation, especially for water, is a quantity useful in many applications. Not only is the rate of evaporation of water useful in meteorology, but also in the control of manufacturing and storage where moisture sensitive materials are handled. Furthermore, in agriculture especially where irrigation is practiced, the control of water resources is significantly important. The knowledge of the evaporation rate is an important factor in such agricultural practices. Moreover, knowledge of the evaporation rates in libraries and museums is important for the preservation of books and antiques.

Presently used commercial instruments for measuring evaporation are quite costly, in the range of about $300 to $800 U.S. dollars. See for example, the *Journal of Hydrology*, 39 (1978) pp. 159–173 for an article discussing pan-evaporimeters and their possibilities and their limitations (pp. 172–173). Furthermore, these instruments are quite bulky and are not conveniently portable. Moreover, presently known instruments do not give a direct measure of evaporation rate but rather only a total rate of evaporation over a period of time from several hours to a day.

An early form of a device for measuring evaporation is the Piché atmometer which consists of a graduated tube with one end closed and the other end open and ground flat, the flat open end being covered by a piece of filter paper pressed against it by a disc. In use, the Piché atmometer is filled with distilled water, the paper circle, and the disc put on, and the whole instrumemt inverted. The device provided a means for determining evaporation by observing the rate at which the liquid in the tube dropped, replaced by air bubbles as the water is drawn from the tube by the drying filter paper. For a description of the Piché atmometer, see *Meteorological Instruments* by W. E. Knowles Middleton, published by the University of Toronto Press, pp. 114–116, particularly FIG. 77, 1942. See also the 1877 Quaterly Weather Report (British) Meteorological Office by W. N. Shaw, pp. 36–38. As described in the aforementioned Quarterly Weather Report, the Piché instrument has three difficulties in that the air bubbles result in non-constant pressure differences, variations in the temperature of the air cause undesirable condensation on the inner wall of the tube, and additional undesirable effects due to variations of temperature and pressure.

According to the present invention, a method and apparatus are provided for measuring the rate of evaporation of a liquid, such as water, by connecting an open-ended tube filled with the liquid to a sheet of fibrous material and saturating the sheet of material with the liquid. As the liquid is evaporated from the sheet of fibrous material, the liquid is drawn from the capillary tube at a rate that is a direct measurement of the rate of evaporation of the liquid.

Figure 1:
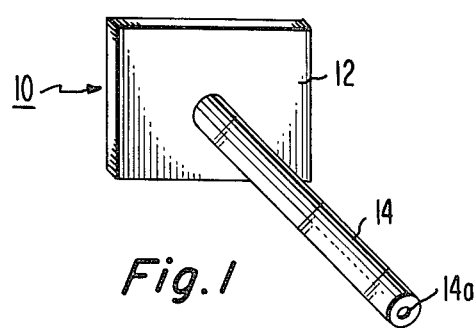
FIG. 1 is a perspective view of an evaporimeter according to the invention.
Figure 2:
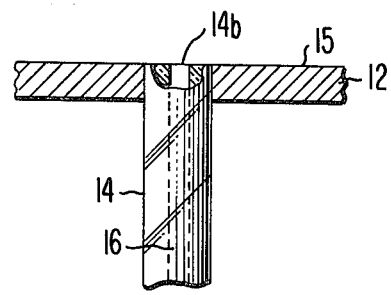
FIG. 2 is a fragmentary cross sectional detail of the evaporimeter as shown in FIG. 1.

The evaporimeter 10, as shown in FIG. 1, is formed of a plate 12 joined to a thick-walled capillary tube 14 having a passageway 16 with an open end 14a remote from the plate 12 and an open end 14b terminating at the surface of the end wall of the tube 14 which is contiguous and coplanar with the surface 15 of the plate 12. The capillary passageway 16 thus extends from the upper surface 15 to the open end 14a of the tube 14. The tube 14 and the plate 12 are preferably made of glass or quartz and the tube 14 is joined integrally with the glass plate 12 as by fusing a portion of the tube into an aperture in the glass plate. Plate 12 is about 10 cm sq. and the inside diameter of the capillary tube passageway 16 is about 1 mm. The ratio of the areas of the plate 12 to the passageway 16 is about 10,000 to one (i.e. $10^4$) the significance of which to be explained.

The term evaporimeter as used in here refers to an apparatus or instrument for measuring the rate of evaporation of a liquid. In the art, the term atmometer is used to refer to an instrument for measuring the rate of water evaporation. At times, such devices are also called evaporation gauges. Nevertheless, this invention provides a means for measuring the rate of evaporation of a liquid and may be termed, for convenience, an evaporimeter.

It should be understood that the rate of evaporation (R) of a liquid depends upon and is influenced by the relative humidity, wind velocity and solar radiation at the measuring site in a complex relationship. In the practice of this invention the evaporation rate is measured directly at the site without distinguishing what effect any one or more of these influencing factors has on that evaporation rate. Accordingly, the measured value of evaporation rate will change as any or all of the influencing factors change.

The evaporimeter is arranged for use by applying to the plate surface 15 a liquid-saturable fibrous material such as filter paper 13 of about 0.1 mm thickness and having an area that is not greater than the surface area of plate 12. When liquid such as water is filled in the capillary tube within the passageway 16 and the filter paper 13 is saturated with water, there is established hydraulic continuity between the liquid in the capillary passageway 16 and the filter paper 13. The principle of the invention depends upon hydraulic continuity being maintained in what may be termed a capillary system comprising the capillary tube 14 and the fibrous material of the filter paper 13.

Hydraulic continuity is provided from capillary action in a capillary system. As known, a manifestation of surface tension by which a portion of a surface of a liquid coming in contact with a solid is either elevated or depressed depends upon the adhesion or cohesive properties of the liquid relative to the material of the type that is used to form the walls of a capillary tube passageway. The flow of liquid in the capillary passageway depends upon the pressure of the environment to which the capillary passageway is exposed, the length of the column of liquid, the surface tension, the capillary radius and the viscosity of the liquid. The relationship of the flow rate through a capillary tube passageway is similar to and applicable to a fibrous material such as filter paper in which the adjacent fibers of the filter paper serve as the walls for a passageway exhibiting the capillary action. See R. L. Peek and D. A. McLean, *Industrial and Engineering Chemistry*, Vol 6, page 85, (1934) for a discussion of capillary flow in filter paper.

The filter paper 13, when exposed to the ambient and saturated with a liquid, provides a large evaporation surface. As the liquid evaporates from the filter paper 13, capillary action replenishes the liquid in the filter paper with the liquid drawn from the capillary tube 14. The column of liquid in the capillary tube is under tension and has a negative pressure with respect to the ambient atmosphere.

Figure 3:
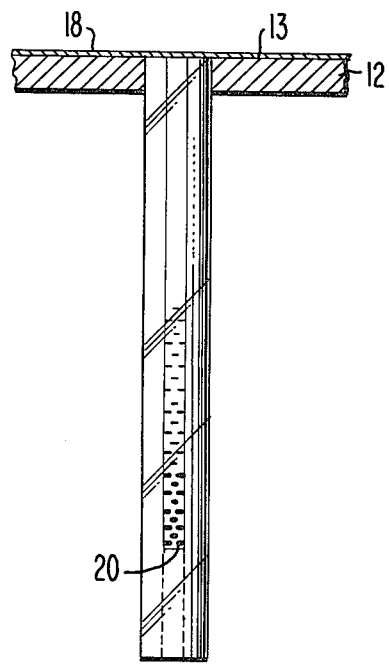
FIG. 3 shows a side elevation view of the assembled elements of the evaporimeter for practicing the invention.

The operation of the evaporimeter 10 will now be described by reference to the drawing, particularly FIG. 3. The filter paper 13 is placed on the plate 12, the evaporimeter 10 being oriented in a vertical position as shown in FIG. 3. The filter paper 13 is wet with water or other liquid to be measured. While wetting the filter paper 13, some liquid runs down to fill the capillary tube passageway 16 and when filled, flows out from the end 14a. Excess liquid is wiped from the bottom of the tube. In this state, the entire capillary system comprising the capillary-like fibers of the filter paper 13 and the capillary tube passageway 16 is hydraulically connected throughout. What this means is that as liquid evaporates from the upper surface 18 of the filter paper 13, the surface 18 shrinks into the space between the fibers and a tension is developed that is communicated to all the liquid in the capillary system. The nature of such a capillary system is to restore the upper surface of the liquid at the surface of the paper to its original level. This is done by water flowing in from the capillary tube passageway 16 upwardly into the fibrous material of the filter paper to replace the water that was lost in the filter paper by evaporation. Thus, all of the water lost by evaporation is replaced by liquid flow up from the capillary tube 16. This causes the liquid front, indicated by reference numeral 20, initially located at the lower end of the tube at opening 14a, to move upwardly.

Since the inner area of the capillary tube 16 is about $10^{-4}$ times the total area of the filter paper from which evaporation is taking place, the liquid moves upward in the capillary tube at a rate that is $10^4$ times the evaporation rate. For example, a large water surface that evaporates 3 mm of water a day can be compared with the motion of the capillary front 20 according to the evaporimeter 10 of the present invention. For the same linear rate of evaporation, the capillary front 20 moves upwardly 10 cm. in about six minutes. Such a rate of movement (R) enables one to measure evaporation rates with good accuracy in a few minutes rather than in a day as done in typical prior art systems.

The evaporation rate (R) is related to the velocity v of the upward motion of the capillary front, (20) the area A of the filter paper 13, and the area a of the capillary tube 16 by the following relationship:

$$R = v(a/A) \qquad (1)$$

Using this relationship and observed values of v, a, and A, I have found good agreement between the evaporation rate R measured for water using this method and that measured by direct observation of evaporation from a shallow pan in the same environment.

Figure 4:
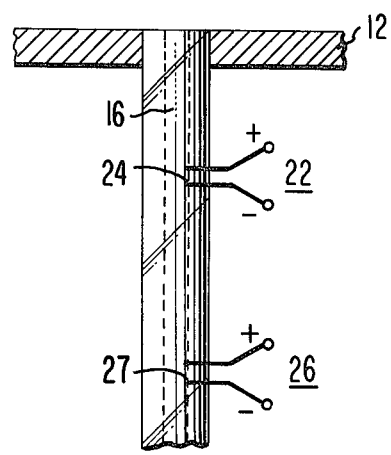
FIG. 4 is a schematic of one embodiment of the invention providing means for determining the rate of evaporation by electrical means.

Refer now to FIG. 4 for an illustration of a means for sensing the liquid front movement in the capillary tube 14. A pair of electrodes 22 are provided through the wall of the tube 14 and exposed to the passageway 16 of the tube with a gap 24. Another pair of electrodes 26 are similarly disposed in another location longitudinally of the tube 14 and also provided to be within passageway 16 of the tube 14 with a gap 27. The electrodes are connected to suitable means to sense the change in resistance between the respective gaps 24 and 27 that would be manifested by the presence or absence of fluid in the gaps.

Figure 5:
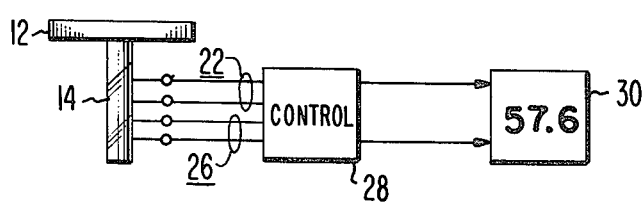
FIG. 5 is a schematic of the system providing an automatic read out of the evaporation rate.

As shown in FIG. 5, the electrode pairs 22 and 26 are coupled to a suitable control circuit 28 which is arranged to respond to the changes in resistance in the gaps 24 and 27 to provide a timing signal as the liquid passes upwardly in the capillary tube. The timing circuit portion of the control 28 determines the elapsed time between the two pairs of electrodes 22 and 26 and a calculation is made by a logic circuit, microprocessor or the like in the control 28 to provide a digital read-out 30 representing the evaporation rate (R) according to equation (1) described hereinabove. The control circuit 28 can read out simply time, or it can be used to convert the evaporation rate (R) in any desired units such as mm/day.

Figure 6:
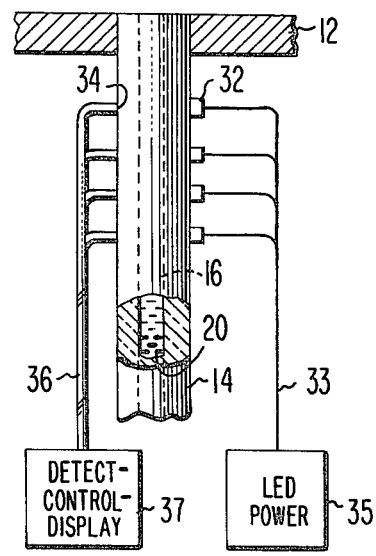
FIG. 6 is a further embodiment of the invention using optical means to determine the evaporation rate according to the invention.

Referring now to FIG. 6, there is illustrated another embodiment of the invention using fiber optics and light emitting diode technology to detect the passage of liquid in the capillary passageway 16. A plurality of light emitting diodes (LEDs) 32 are affixed to and along one surface portion of the tube 14. The diodes 32 are energized by an LED power supply 35 via bus 33. A same plurality of fiber optical bundle ends 34 are affixed to the surface portion of tube 14 opposite the LEDs 32. The bundle ends 34 are derived from a composite fiber optic bundle 36 which is connected to a detector, control, and display 37, which initially detects the light from each of the ends 34. The detected light from each end 34 is then converted to an electrical signal indicative of the amount of light received from the corresponding LED 32. The signals are processed and used to provide a display of the evaporation rate (R) in a manner similar to control 28 and display 30 of FIG. 5.

In operation, light from the light emitting diodes 32 will or will not be passed to ends 34 as the liquid front 20 (FIG. 3) moves upwardly in the tube 14 as the liquid is absorbed by filter paper 13. The evaporation rate (R) is determined and displayed in a similar manner as explained above.

Figure 7:
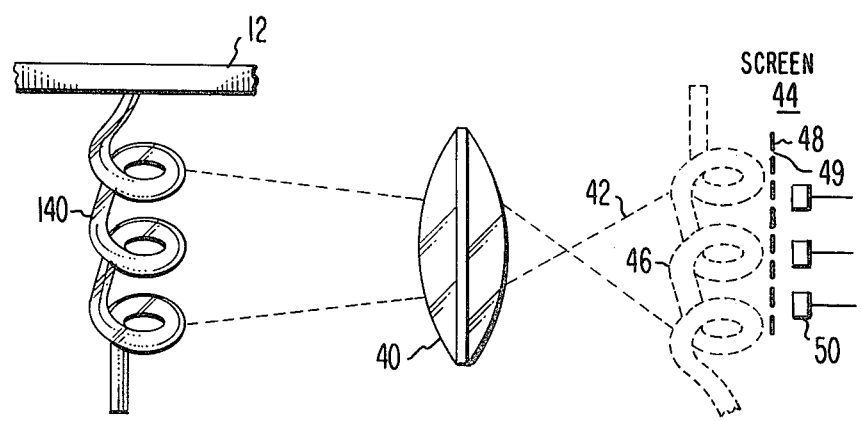
FIG. 7 is a still further embodiment of the invention using a helical or spiral form of the capillary tube and further illustrating imaging means for determining the evaporation useful for any form of the invention.

Reference is now made to FIG. 7, illustrating a helical capillary tube 140. Tube 140 in all respects is the same as the linear cylindrical tube 14 illustrated in FIG. 1 and described hereinabove except that it is helical. The advantage of this form of the capillary tube is that it will save space by providing for a substantial length of capillary tube for the hydraulic system of the invention in a relatively short height. The tube may be also formed as a spiral in a plane and thereby further reduce the height of the evaporimeter 10. Otherwise, the capillary tube 140 operates in the same manner as described herein. In addition, as shown in FIG. 7, a lens 40 may be provided in the field of view of the tube 140 to collect light therefrom and focus it as an image 46 via beam 42 on a screen 44 comprising a plurality of apertures 44 in plate 48, each hole backed by a photodetector 50. The photodetectors 50 sense the motion of the liquid front passing upwardly in the tube 140. Such motion is utilized to provide information concerning that motion in the manner described hereinabove.

For the purposes of determining the evaporation rate of water, it is preferred that distilled water be used with the understanding that there is usually sufficient resistivity in distilled water that can be detected by electrode pairs 22, etc., as illustrated in FIG. 4 for determining the flow rate. Nevertheless, optical means such as illustrated by FIGS. 6 and 7 may be used regardless of the form of the water or for that matter any liquid selected for measurement purposes. It will be further understood that salt water can be used in the practice of the invention with the understanding that the evaporation rate from the paper 13 is expected to be lower because the vapor pressure is lower for salt water. However, with the use of salt water or, for that matter, any liquid that has a contaminant in it will cause residue in the filter paper, requiring more frequent replacement of the filter paper.

In a preferred form of the invention, the filter paper is about 0.2 mm thick and the diameter of the paper is 9 cm. The diameter of the capillary tube is 1.0 mm. A suitable filter paper is manufactured as the well known Whatman No. 4 qualitative type filter paper or the Fisher brand qualitative "coarse" type filter paper. In practice, one can use a single sheet of such filter paper or two sheets stacked one on the other.

In practicing the invention, it will be noticed by reference to equation (1) described above that for a given evaporation rate (R) the velocity v of the motion of the capillary front (20) is determined by the ratio of the capillary tube area a and the filter paper area A. Thus, for the use of the invention in an ambient which is quite dry, a filter paper with a smaller area a might be desirable. Furthermore, for environments that are rather humid, a larger area A of the filter paper may be desirable. However, there is an upper limit in the area (A) that one can use, determined by the capillary flow of water laterally from the capillary tube portion 16 to the extremities of the filter paper. In practice, it should be understood that the flow of water from the capillary tube portion (16) of the apparatus to the extremities of the filter paper (13) must be sufficient to maintain the entire surface of the filter paper wet.

The structural portion of the described evaporimeter can be made of materials other than glass or quartz. Such other materials may be metal or plastic. Furthermore, the invention as described provides for visually, automatically determining the evaporation rate (R). It will be appreciated by those skilled in the art that data of the evaporation rate (R) can be collected and stored or utilized on a real time basis by transmission to centralized locations.

What is claimed is:

1. A method for measuring the rate of evaporation of a liquid comprising the steps of:
    connecting a capillary tube to a sheet of fibrous material;
    saturating the sheet with liquid;
    providing to said sheet additional liquid sufficient to cause liquid to flow from said liquid-saturated sheet into said capillary tube to establish hydraulic continuity of the liquid in the sheet and in the capillary tube; and
    determining the rate of evaporation of the liquid by movement of the liquid drawn through the tube as the liquid evaporates from the sheet.

2. The method of claim 1, wherein the liquid is water.
3. The method of claim 1, wherein the liquid is salt water.
4. The method of claim 1, wherein the liquid is distilled water.
5. The method of claim 1, wherein the sheet of fibrous material is filter paper.
6. The method of claim 1, wherein the tube has a capillary passageway of about 1 mm and the diameter of the sheet is about 9 cm sq.
7. The method according to claim 1, wherein the rate (R) of evaporation is related to the velocity v of the movement of the liquid in the capillary tube by the relationship $R = v(a/A)$, wherein a is the cross sectional area of the passageway of the capillary tube and A is the area of the sheet of fibrous material.

8. Apparatus for measuring the rate of evaporation of a liquid comprising:
    a capillary tube having two open ends joined at one end to a plane having two parallel extensive surfaces such that the one end portion of the tube extends through one of the plane surfaces and terminates at the other plane surface; and
    a sheet of liquid saturatable fibrous material attached to the other surface and extending sufficiently over the plane surface to cover the surface and the capillary tube end;
    whereby liquid saturating the sheet and extending through the capillary tube will be drawn from the tube into the sheet as liquid evaporates from the sheet, the rate of movement of liquid in the tube being an indicia of the evaporation rate of the liquid from the sheet.

9. The apparatus of claim 8, wherein the sheet of fibrous material is filter paper.
10. The apparatus according to claim 8, wherein the tube has a capillary passageway of about 1 mm and the diameter of the surface is about 9 cm.
11. The apparatus according to claim 8, wherein the rate of evaporation (R) is related to the velocity v of the movement of the liquid in the capillary tube by the relationship $R = v(a/A)$, wherein a is the cross sectional area of the passageway of the capillary tube and A is the area of the sheet of fibrous material.
12. The apparatus according to claim 8, further comprising at least two pairs of electrodes positioned in the capillary passageway including means for sensing the presence of liquid in the tube; and
    means connected to said electrodes for determining the rate of movement of liquid passing said electrode pairs.
13. Apparatus according to claim 8, further including light emitting diode means attached to said tube in spaced relation longitudinally of said tube;
    light responsive means spaced adjacent the light emitting diode means to sense light from each respective diode; and
    means coupled to said light emitting diode and light sensing means to determine the rate of movement of liquid passing through said tube, the amount of light passing from the diode to the sensor being a function of the presence or absence of liquid in the tube therebetween.
14. Apparatus according to claim 8, wherein said capillary tube is in the form of a helix.
15. Apparatus according to claim 8, wherein said capillary tube is in the form of a spiral in a plane.
16. Apparatus according to claim 8, including means for projecting an image of the capillary tube onto a light sensitive screen for displaying the rate of movement of liquid through the tube.

* * * * *